(12) United States Patent
Hakola et al.

(10) Patent No.: US 8,359,038 B2
(45) Date of Patent: Jan. 22, 2013

(54) CHANNEL ACCESS FOR LOCAL HETEROGENEOUS COMMUNICATION IN A CELLULAR NETWORK

(75) Inventors: Sami-Jukka Hakola, Kempele (FI); Vinh V. Phan, Oulu (FI); Timo K. Koskela, Oulu (FI); Gilles Charbit, Farnborough (GB)

(73) Assignee: Nokia Corporation, Espoo (FI)

( * ) Notice: Subject to any disclaimer, the term of this patent is extended or adjusted under 35 U.S.C. 154(b) by 132 days.

(21) Appl. No.: 12/815,789

(22) Filed: Jun. 15, 2010

(65) Prior Publication Data

US 2011/0306349 A1 Dec. 15, 2011

(51) Int. Cl.
*H04W 72/00* (2009.01)
(52) U.S. Cl. ............ 455/450; 455/452.1; 455/464; 455/509; 370/329; 370/338; 370/341
(58) Field of Classification Search ....... 455/450–452.2, 455/422.1, 464, 509, 63.1, 114.2, 161.3, 455/227.2, 67.3; 370/395.2, 395.21, 414–418
See application file for complete search history.

(56) References Cited

U.S. PATENT DOCUMENTS

| | | | |
|---|---|---|---|
| 5,706,274 A | 1/1998 | Angelico et al. | 370/85.3 |
| 2004/0170150 A1* | 9/2004 | Guo et al. | 370/338 |
| 2007/0280332 A1* | 12/2007 | Srikanteswara et al. | 375/130 |

FOREIGN PATENT DOCUMENTS

| | | |
|---|---|---|
| GB | 2 433 175 A | 6/2007 |
| WO | WO-2010/097645 A1 | 9/2010 |

OTHER PUBLICATIONS

Reggiani, et al., "Minimum Interference Distributed Scheduling for Packet Transmission", (2008), (pp. 411-415).
Bianchi, "Performance Analysis of the IEEE 802.11 Distributed Coordination Function", IEEE Journal on Selected Areas in Communications, vol. 18, No. 3, (Mar. 2000), (pp. 535-547).
3GPP TS 36.101, V9.3.0 (Mar. 2010), $3^{rd}$ Generation Partnership Project; Technical Specification Group Radio Access Network; Evolved Universal Terrestrial Radio Access (E-UTRA); User Equipment (UE) Radio Transmission and Reception (Release 9) 172 pages.
"50 Billion Connected Devices" Ericsson (Dec. 2009) 9 pages.

* cited by examiner

*Primary Examiner* — Chuong A Ngo
(74) *Attorney, Agent, or Firm* — Harrington & Smith

(57) ABSTRACT

In an exemplary embodiment there are determined which radio resource are to be used for contention based access, and the allocated radio resource is accessed according to a probability function that varies in dependence on at least one of interference measured on the allocated radio resource and a received power level for the allocated radio resource. By example the radio resource is allocated by a cellular base station for use in D2D communications; the base station provides configuration parameters for the D2D communications via common or dedicated signaling; the received power level is a target received power level that is received via broadcast system information or dedicated control signaling; and/or the received power level is itself a function of pathloss on a wireless link to the cellular base station. Embodiments are presented for method, apparatus, and tangibly stored computer program.

18 Claims, 9 Drawing Sheets

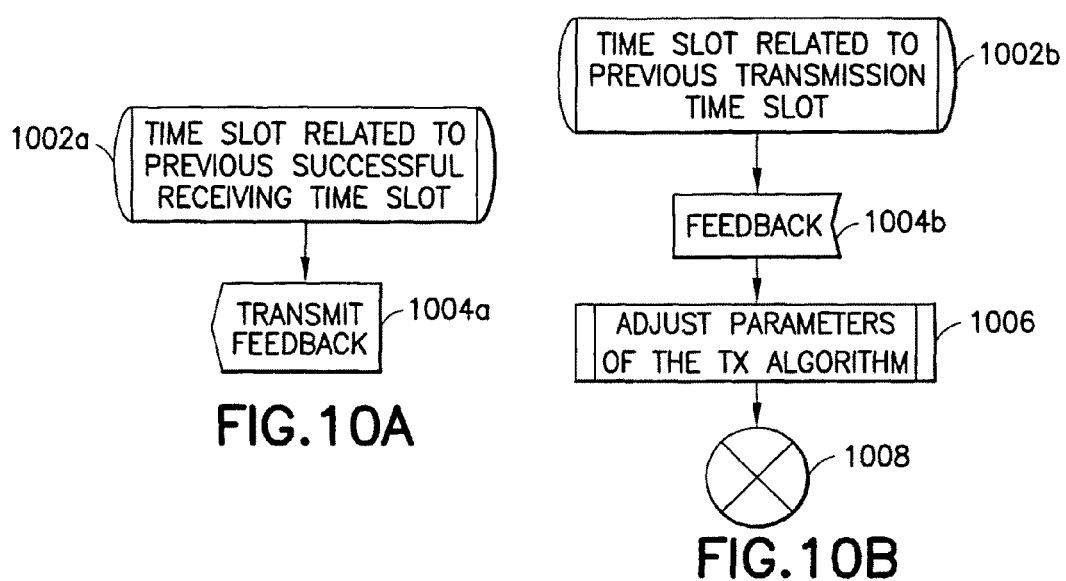
FIG.10A
FIG.10B
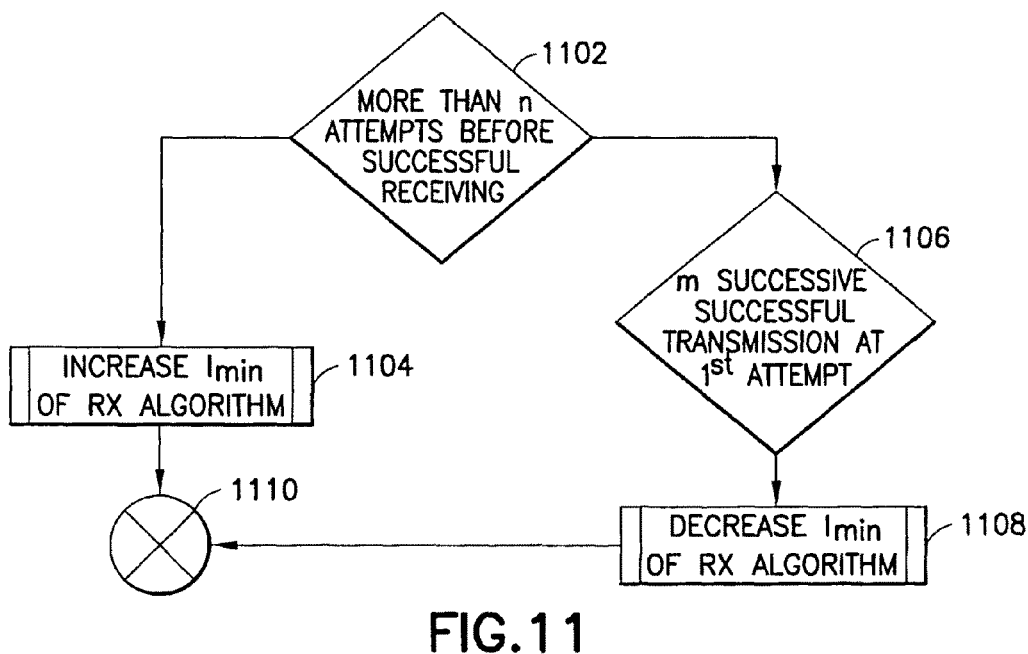
FIG.11

CHANNEL ACCESS FOR LOCAL HETEROGENEOUS COMMUNICATION IN A CELLULAR NETWORK

TECHNICAL FIELD

The exemplary and non-limiting embodiments of this invention relate generally to wireless communication systems, methods, devices and computer programs and, more specifically, relate to communications in heterogeneous networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

| | |
|---|---|
| 3GPP | third generation partnership project |
| D2D | device to device (sometimes termed machine to machine M2M or peer-to-peer P2P) |
| eNB | EUTRAN Node B (evolved Node B) |
| LTE/LTE-A | long term evolution/long term evolution-advanced |
| MAC | medium access control |
| MCS | modulation and coding scheme |
| RB | radio bearer |
| UE | user equipment |
| UL | uplink (UE towards eNB) |

Recent research has gone into integrating new network topologies into cellular networks. For example, there is a study item in LTE/LTE-A of 3GPP for deploying a heterogeneous network of macros, micros, picos, femtos and relays in the same spectrum. Extending this a bit further enables heterogeneous local communication directly among devices and machines under supervision of the network, which might include D2D communications, communication in the cluster of devices, a grid or group of local machines communicating so as to perform certain tasks in co-operative way, and an advanced device acting as a gateway for a number of other low-capability devices or machines to access the network. A common theme in these examples is that they each utilize a secondary usage of the cellular network.

FIG. 1 illustrates a non-limiting example of such a heterogeneous network with local connections. There is a cellular base station/eNB 101 and typical UEs 102, 103, 104 operating in the cellular communication mode with the base station 101. In this mode, the links 102d, 103d and 104d carry data as well as control signaling. UEs 105, 106 are in direct communication with one another over a D2D link 105d which carries data. The D2D link 105d is facilitated via control signaling with the base station 101 over control-only links 105c, 106c that carry no data, and so the D2D network is integrated into the cellular network. Either or both of these other UEs 105, 106 may also simultaneously have a traditional cellular link with the base station for traditional cellular data communications, but for simplicity of description assume their links 105c, 106c with the base station 101 carry only control information and no data.

One of the problems in integrating local heterogeneous communication into a cellular network is the dynamic interference fluctuation, with a relatively large standard deviation, at the receiver of a local communication device 105, 106 as compared to the standard deviation of the interference power of the cellular users 102, 103, 104 measured at the eNB 101, when we consider the UL as a resource for the secondary communication 105d. Interference at the local communication devices 105, 106 comprises mainly cellular users 102, 103, 104 in the same and in neighbor cells using the same radio resources (time and frequency). Intra-cell interference can be minimized among cellular 102-104 and secondary 105-106 usage via scheduling by the eNB 101, but inter-cell interference from cellular users in neighbor cells is a significant concern. This concern is more acute for uncoordinated cellular network deployments where one can assume only a small amount of co-operation between neighbor eNBs.

FIG. 2 is histogram of interference power that illustrates a difference in the interference situation of the cellular 102-104 and local 105-106 communication devices, assuming a hexagonal grid layout of omnidirectional cells. Interference power at the eNB 101 is shown as bars 204, interference power at the local/D2D UEs 105-106 is shown at bars 203 when no cellular user 102-104 is using the same resources in the same cell, and at bars 202 when there is a cellular user 102-104 using the same resources in the same cell as the local/D2D device 105-106. Even for the case in which the local/D2D devices 105-106 are given dedicated resources in the cell, shown as the doubled bars 204, the deviation of the interference power is much larger than in the cellular case 206. Additionally, the deviation of the interference increases as a function of distance to the eNB 101 as can be seen in FIG. 3.

Additionally, even though local/D2D devices 105-106 have been assigned resources that are orthogonal to a cellular user 102-104 located close to the local/D2D device, and even if we assume high transmit power due to phase noise and carrier synchronization error (EVM) and inverse fast Fourier transform (IFFT) non-perfect orthogonality at the transmitter, there will be in-band emission over subcarriers other than those the transmitter is using. 3GPP TS 36.101 (v9.3.0, 2010-03) gives minimum requirements for such in-band emissions, defined as the average across 12 sub-carriers and as a function of the RB offset from the edge of the allocated UL transmission bandwidth. The in-band emission is measured as the relative UE output power of any non-allocated RB(s) and the total UE output power of all the allocated RB(s). In equation (0) below the formula is given for calculating the minimum requirements for in-band emissions according to 3GPP TS 36.101. FIG. 4 illustrates the in-band emission requirements for QPSK (quadrature/quaternary phase shift keying) and 16-QAM (quadrature amplitude modulation) modulations.

$$\max[-25, (20 \cdot \log_{10} EVM) - 3 - 10 \cdot (\Delta_{RB} - 1)/N_{RB})] \quad (0)$$

This means that the interference situation depicted in FIGS. 2-3 is further challenged by the leakage power of the cellular communication mode users.

With the above challenging interference environment in mind, consider further that low-capability low-power machines/devices may need to send fixed length MAC packets to each other locally. Thus, effective link adaptation and MCS selection scheme may not be helpful for the channel access scheme. From another perspective, wireless engineering seeks to minimize control signaling overhead such as required feedback signaling between local/D2D devices 105-106 and the supervising cellular network 101 as well as feedback signaling between those local/D2D devices 105-106.

SUMMARY

The foregoing and other problems are overcome, and other advantages are realized, by the use of the exemplary embodiments of this invention.

In a first aspect thereof the exemplary embodiments of this invention provide a method, comprising: determining a radio resource for contention based access; and accessing the allocated radio resource according to a probability function that varies in dependence on at least one of interference measured on the allocated radio resource and a received power level for the allocated radio resource.

In a second aspect thereof the exemplary embodiments of this invention provide a memory storing a program of computer readable instructions, that when executed by at least one processor result in actions comprising: determining a radio resource for contention based access; and accessing the allocated radio resource according to a probability function that varies in dependence on at least one of interference measured on the allocated radio resource and a received power level for the allocated radio resource.

In a third aspect thereof the exemplary embodiments of this invention provide an apparatus, comprising at least one processor and at least one memory storing computer program code. The at least one memory and the computer program code are configured, with the at least one processor, at least to: determine a radio resource for contention based access; and access the allocated radio resource according to a probability function that varies in dependence on at least one of interference measured on the allocated radio resource and a received power level for the allocated radio resource.

BRIEF DESCRIPTION OF THE DRAWINGS

FIG. 10A-B are logic flow diagrams that illustrates, in accordance with exemplary embodiments of this invention, the operation of methods, and a result of execution of computer program instructions embodied on a computer readable memory showing procedures related to a successful receiving time slot and a successful transmission time slot.

FIG. 11 is a logic flow diagram that illustrates, in accordance with an exemplary embodiment of this invention, the operation of a method, and a result of execution of computer program instructions embodied on a computer readable memory showing parameter adjustment of the receiving algorithm.

DETAILED DESCRIPTION

Figure 1:
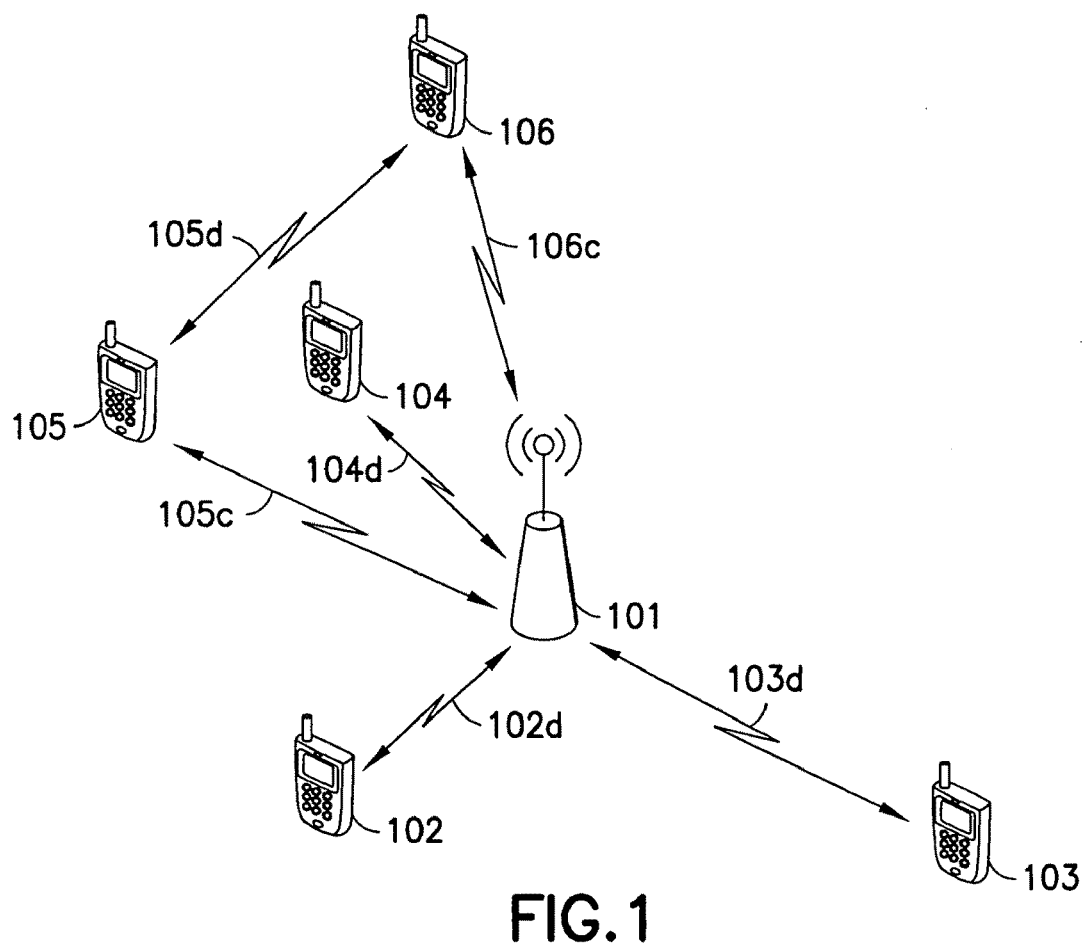
FIG. 1 is a schematic diagram illustrating D2D communication integrated into a cellular network.
Figure 3:
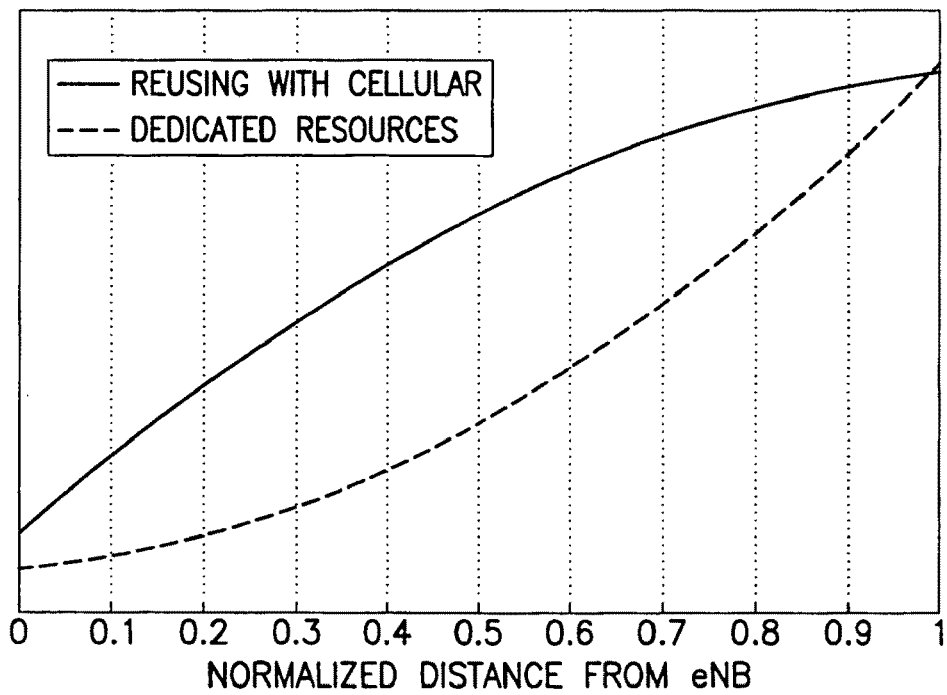
FIG. 3 is a graph illustrating deviation of interference power at the D2D device as a function of distance to the eNB for two cases: one in which the D2D link uses the same radio resources with some cellular user in the same cell; and one in which dedicated resources are given to D2D link in the cell.
Figure 2:
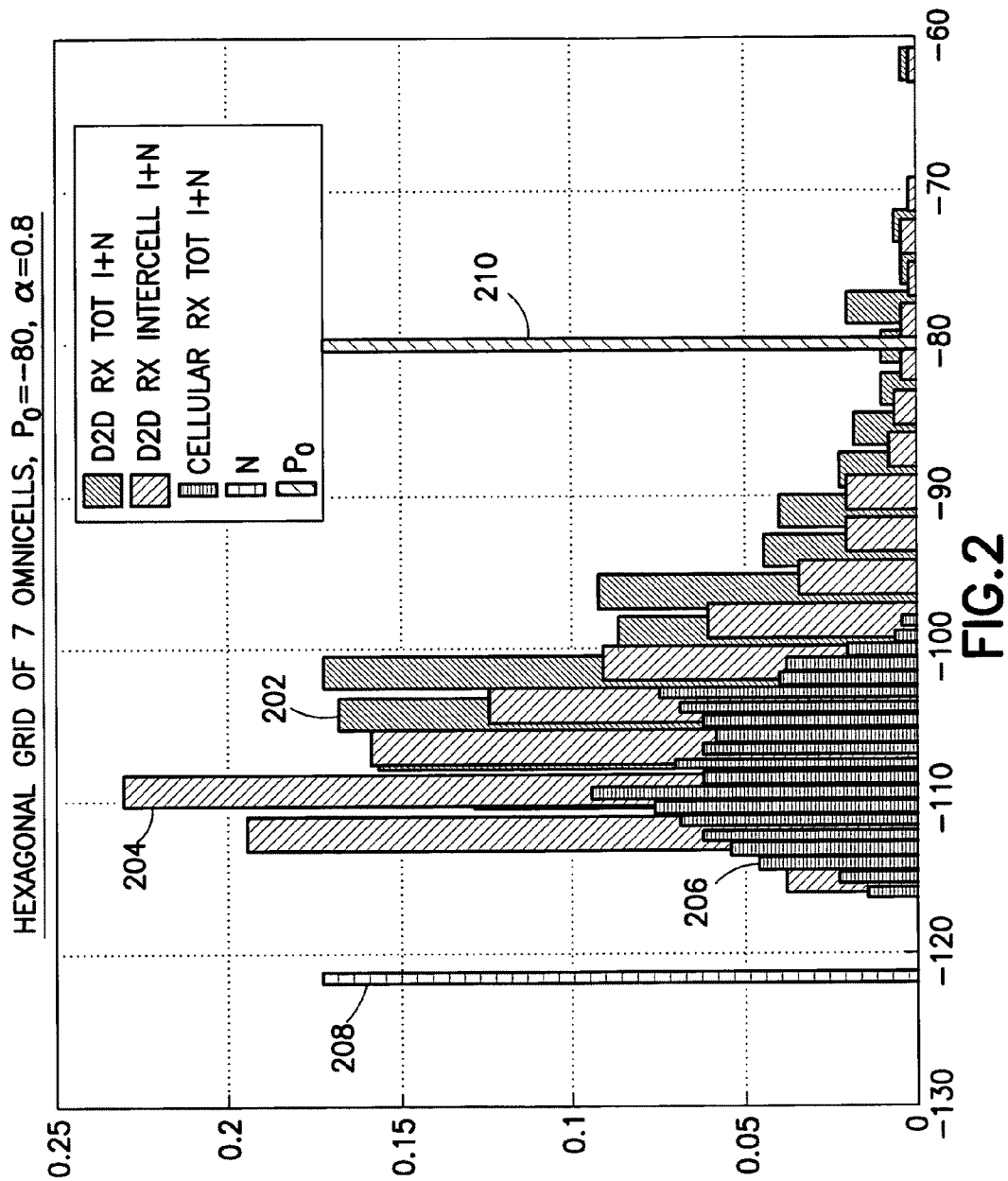
FIG. 2 is a histogram showing interference power distribution at the eNB and the D2D receiver of FIG. 1.
Figure 4:
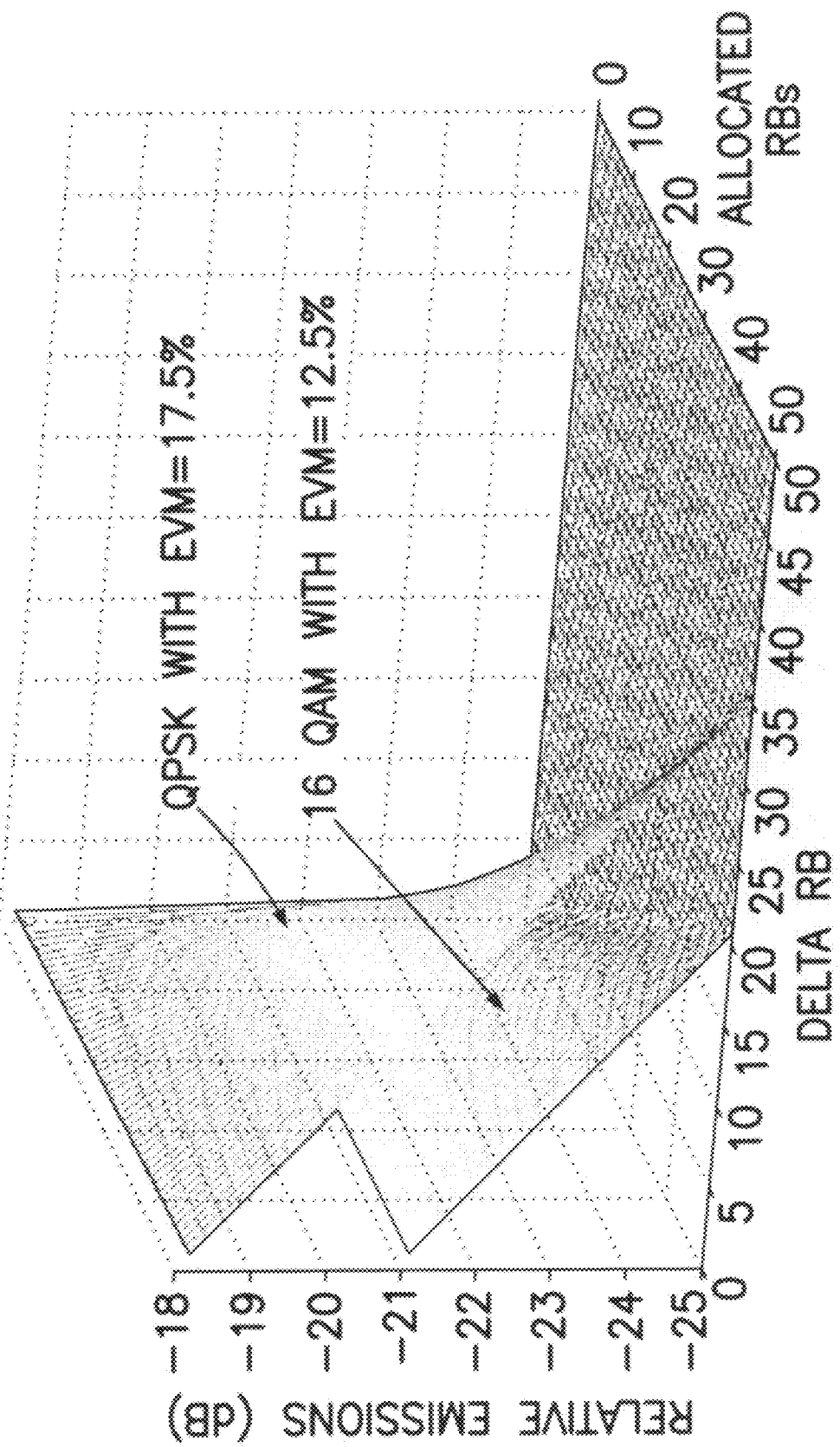
FIG. 4 is a 3-dimensional diagram illustrating in-band emission requirements for QPSK and 16-QAM as a function of allocated resource blocks and resource block offset from the edge allocated uplink transmission bandwidth.

Above it is shown that current research trends toward cellular system control over D2D radio resources for a heterogeneous wireless arrangement. To formalize this control assume that the cellular system allocate radio resources for D2D use in the cell. It is also known that D2D resources can be made contention based, such that no individual D2D device 105-106 is allocated transmit and receive links but instead they must compete among each other for channel access. While FIG. 1 shows only two D2D devices 105-106, there may be for example three or more D2D devices forming one cohesive group or four or more devices forming two or more separate D2D groups. This broader concept of D2D communications in the eNB's cell can be captured by considering that the cellular system allocates radio resources to D2D device groups, where FIG. 1 shows one such group of two D2D devices but the allocated resources may be used by however many D2D devices in however many cohesive D2D groups that might be operating within the eNB's cell. Such D2D allocated resources are thus common among any D2D device within the cell.

According to an exemplary embodiment of the invention, the various D2D devices 105-106 access the allocated common D2D resources on a contention basis according to a probability function that varies in dependence on interference that is measured on the allocated radio resource which those D2D devices 105-106 are seeking to access. Accordingly, in an exemplary embodiment a higher measured interference means a more crowded channel and a lower probability that the D2D device will be allowed to access the channel at any given moment. Similarly, a lower measured interference means a less crowded channel and a higher probability that the D2D device will be allowed to access the channel at any given moment.

By example, such common D2D resources may be utilized as a common contention-based direct access channel in uplink 105c, 106c of the local cells across the D2D registration area. That is, the cellular UL radio resources 105c, 106c for the D2D devices 105-106 are the radio resources that the cellular system/eNB 101 allocates for the D2d communications 105d in the cell. The UEs utilizing this contention based resources may be D2D users that are specifically registered with the cell/eNB 101 as D2D users, or other authenticated mobile users, The contention based channel 105d may be used for sending data and control messages between devices 105-106.

The above mentioned probability function for the contention-based access utilizes a dynamic variable, namely channel interference, to determine the probability for accessing the channel. In an exemplary embodiment the probability function varies in dependence on measured channel interference and on the set target received power level of the local D2D link 105d. One such exemplary probability function is shown below at equation (1):

$$P_{access\_channel} \propto \frac{\max[0, P\_0_{local} + \text{offset} - \max(I_{measured}, I_{min})]}{P\_0_{local} + \text{offset} - I_{min}} \quad (1)$$

in which:
  $P\_0_{local}$ is the target received power level for the D2D link 105d;
  offset is a parameter to adjust the range in which greater than zero probabilities exist related to certain values of $P\_0_{local}$;
  $I_{measured}$ is measured interference; and
  $I_{min}$ is a parameter indicating the interference level for which the channel access probability is 1.

By non-limiting example, the parameters $P\_0_{local}$ and $I_{min}$ are configured by the eNB, and the parameter $I_{measured}$ is measured by the local D2D communication device 105-106. In a specific but non-limiting embodiment, $P\_0_{local}$ is set to correspond to the target received power $P\_0$ in fractional power control of the LTE (cellular) uplink.

Additionally, in an exemplary embodiment the $I_{min}$ parameter is adjusted by the locally communicating devices 105-106 according to their earlier channel accesses. So for example the value of $I_{min}$ would be decreased if the previous channel access attempt(s) has not been successful and correspondingly the value of $I_{min}$ would be increased if the previous access attempt(s) have been successful. IN a more particular exemplary embodiment, the D2D devices 105-106 adjust value of both offset and $I_{min}$ to implement a kind of sliding window of the area to which the probability is related.

The adjustment is based on the feedback from the intended receiver and thus the probability function indirectly takes the interference situation at the receiver into account even the interference level $I_{measured}$ used in the above probability formula is measured by the transmitter. It is a reasonable assumption at least for current D2D implementations that the transmitter and receiver are quite close to each other, and so it follows that the interference they experience is quite correlated.

In an exemplary embodiment, the value of the parameter $P\_0_{local}$ is set initially as a function of the path loss to the eNB 101, so as to allow a higher transmission probability corresponding to a further distance between the D2D device 105 and the eNB 101. This helps overcome the tendency of the variance of the interference to increase in correspondence with nearness to the cell edge. As an exemplary but non-limiting implementation of this concept, the initial and maximum allowed transmission power for the D2D device 105 on the D2D link 105d could be:

$$P\_0_{local} \propto P\_0 + PL_{eNB} + \text{offset}_{local} \quad (2)$$

where
  $\text{offset}_{local}$ is a power offset for transmit power on the D2D link; and
  $PL_{eNB}$ is the pathloss to the eNB.

In an exemplary embodiment, the two parameters $\text{offset}_{local}$ and $P\_0$ are configured by the serving eNB 101, for example to make the initial setting similar to the uplink power control formula of cellular users.

In an embodiment as noted above, the local devices 105-106 may dynamically adjust their own transmission power on the D2D link 105d and not the offset and $I_{min}$, during their D2D communications. In this example, such an adjustment could decrease the $P\_0_{local}$ by a fixed amount per each successful transmission event. This would decrease the transmission power and also simultaneously increase the probability that the device 105-106 is able to access the channel per certain interference level with that reduced transmit power level. Said another way, if the local device/machine 105-106 causes less interference due to decreasing its transmission power on the D2D link 105d, it is allowed to access the D2D channel 105d more frequently. In a corresponding example where transmission power is increased, each unsuccessful transmission event would result in a fixed increase to the transmission power until the maximum transmission power level is reached. This simultaneously decreases the probability that the device 105-106 can access the D2D channel 105d with that increased transmission power.

The above exemplary procedures are from the perspective of the transmitting side of any individual communication over the D2D link 105d. From the perspective of the receiver side, in an exemplary embodiment the receiving D2D device 105-106 may also make some predictive decision based on the decision function whether it should stop receiving the channel, for example if $I_{measured}$ at the receiver side exceeds a certain threshold level.

Furthermore, in case of the D2D device pair 105-106, in an embodiment these pair members may coordinate with one another as to the channel access, for example they may each use a random generator that is synchronized between them. In this case the decision made at the receiver side to monitor the D2D channel 105d is reliable enough to match when the decision at the transmitting side indicates that the transmitting device 105-106 is allowed to access the channel 105d. As a simple example, when the receiving device 105-106 predicts that the probability is less than a predefined threshold level (for example 50%) that the transmitting device will access the channel, the receiving device 105-106 then simply suspends its monitoring of the D2D link and stops receiving.

To minimize the number of instances in which the transmitting device 105-106 is transmitting but the receiving device 105-106 is not receiving, in an embodiment both transmitting and receiving devices 105-106 utilize the contention-based channel access probability. For example, the transmitting probability could be implemented as detailed above and the receiving probability could be initially set as a function of the transmitting probability summed with a scalar value. In practice this assures that the initial channel access receiving probability can be made greater than the transmitting channel access probability. After receiving a packet the receiving probability could be set to 1 as long as there is again a certain amount of inactivity noticed by the receiver device 105-106.

In practice of course both local D2D devices 105-106 act as transmitters and receivers at different time instants, and so each implements a transmit probability function and a receive probability function. So from the perspective of only one local D2D device 105, in an exemplary embodiment once that device 105 transmits on the D2D link 105d, it sets its receiving probability to 1 in order to receive the feedback from the intended recipient device 106 of the original transmission. Furthermore, after a successful transmission over the D2D link 105d, in an exemplary embodiment the transmitting device 105 also conveys information about how many attempts were needed for the transmission to be successful (for example, how many attempts before the receiver acknowledged the transmission). This information may then be used by the receiving device 106 to adjust its receive probability.

In an exemplary embodiment, the local D2D devices 105-106 may also agree about a common interference level, which if exceeded results in both of them mutually backing off from the computed access probabilities and re-setting them to zero. In this exemplary embodiment there is a mutual communication 105d established between the devices 105-106 and by using a common interference level it is inherently agreed that the interference they experience is highly correlated. The time interval during which the above mutual backoff occurs can be set by the cellular/supervising network, or can be negotiated and agreed among the local D2D devices 105-106 themselves. As a specific implementation example, during the mutual backoff both D2D devices 105-106 respond to the condition that interference exceeds the common level by switching off their radio interfaces and waking up after some backoff time interval to check the current interference level.

The backoff time interval could be dynamically varied according to activity history according to a specific exemplary embodiment. For the case in which there are multiple devices communicating with each other over D2D links, for example in cluster communication among more than two D2D devices, these clustered devices will then use synchronized backoff timers.

Respecting the interference measurement itself which is used in the comparison against the common interference level, the interference measurement may or may not be made per transmission time interval TTI, depending on the specific implementation. By example, the interference measurement may be taken once per TTI, once per X number of TTIs where X is an integer greater than one, or it may be taken based on a parameter other than transmission frame length so that the interference is measured more than once per TTI (or there may be an automatic tuning of the time for taking an interference measurement so that as the measured interference comes closer to the common level the interference measurements are taken more frequently).

So in summary, exemplary but non-limiting embodiments of the invention, the channel access probability in a contention based channel access is set in a manner that integrates into the operation of the cellular system by using derived parameters of the cellular system context in order to provide efficient and interference-aware channel access. By example, such derived parameters are $\text{offset}_{local}$ and $P\_0_{local}$ which as detailed above are derived from the cellular parameters offset and $P\_0$.

In addition, the exemplary channel access probability adapts for prevailing and local radio conditions, and embodiments of the invention further find the suitable transmission power for the local communication. The local D2D devices 105-106 can also implement both adaptive transmission and receiving channel access probabilities to enable efficient power savings.

Figure 5:
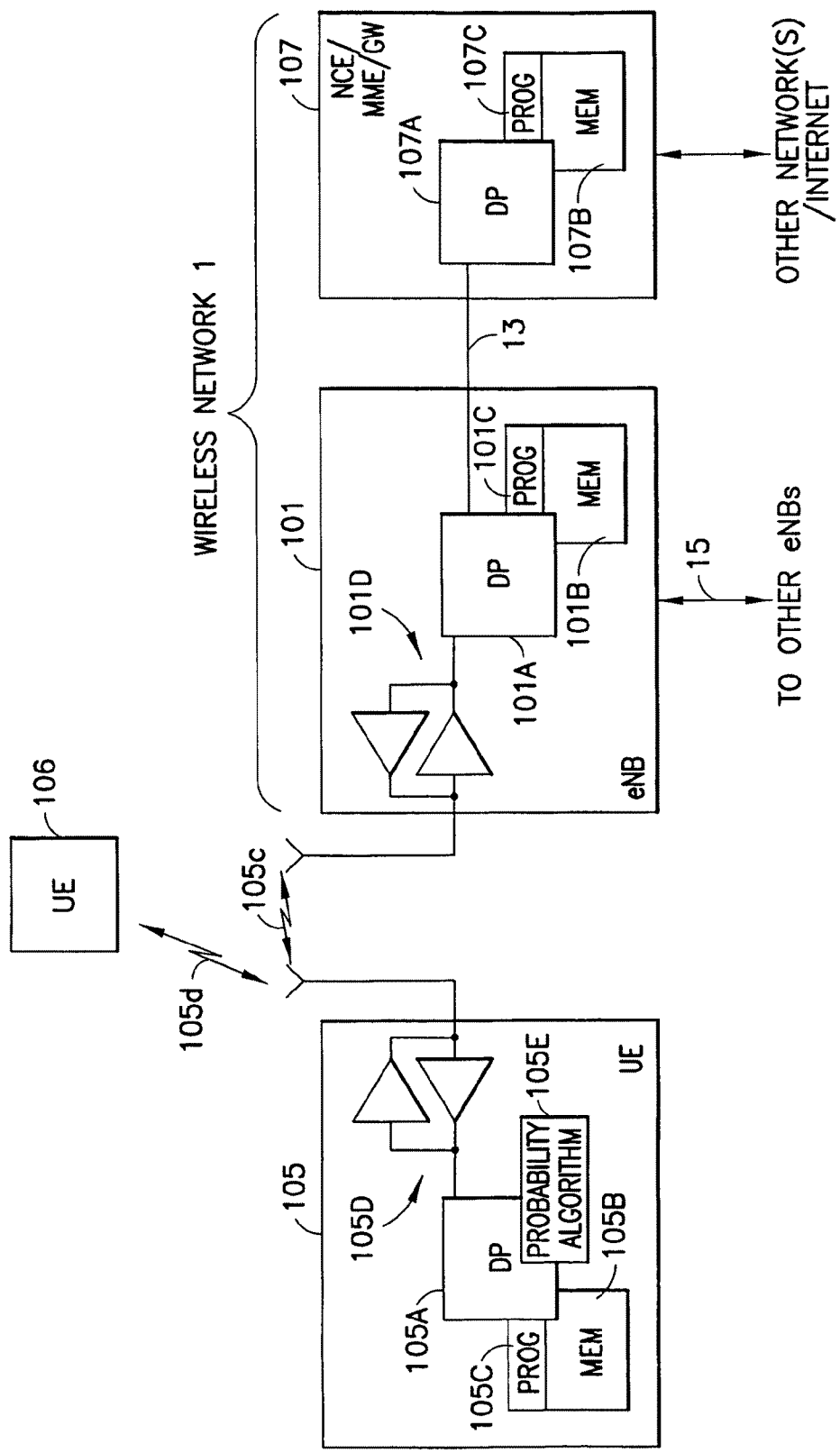
FIG. 5 shows a simplified block diagram of various electronic devices that are suitable for use in practicing the exemplary embodiments of this invention.

Before detailing the process flow diagrams of FIGS. 6 through 14, now are detailed at FIG. 5 a simplified block diagram of various electronic devices and apparatus that are suitable for use in practicing the exemplary embodiments of this invention. In FIG. 5 a wireless network 1 is adapted for communication over a wireless link 105c with an apparatus, such as a mobile communication device which may be referred to as a UE 105, via a network access node, such as a Node B (base station), and more specifically an eNB 101. The network 1 may include a network control element (NCE) 107 which provides connectivity with a further network such as a telephone network and/or a data communications network (e.g., the internet). The UE 105 of FIG. 5 is in the position of the local D2D device 105 shown at FIG. 1, and the D2D link 105d is with a second UE 106 which may be constructed similar as the first UE 105.

The UE 105 includes a controller, such as a computer or a data processor (DP) 105A, a computer-readable memory medium embodied as a memory (MEM) 105B that stores a program of computer instructions (PROG) 105C, and a suitable radio frequency (RF) transceiver 105D for bidirectional wireless communications with the eNB 101 via one or more antennas. The eNB 101 also includes a controller, such as a computer or a data processor (DP) 101A, a computer-readable memory medium embodied as a memory (MEM) 101B that stores a program of computer instructions (PROG) 101C, and a suitable RF transceiver 101D for communication with the UE 105 via one or more antennas. The eNB 101 is coupled via a data/control path 13 such as an S1 interface to the NCE 107. The eNB 101 may also be coupled to another eNB via data/control path 15, which may be implemented as an X2 interface.

At least one of the PROGs 105C and 101C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 105A of the UE 105 and/or by the DP 101A of the eNB 101, or by hardware, or by a combination of software and hardware (and firmware).

For the purposes of describing the exemplary embodiments of this invention the UE 105 may be assumed to also include an access probability algorithm 105E which operates to dynamically compute the transmit probability and the receive probability, and to constrains operation of the transceiver 105D of the UE 105 according to the computed probabilities, as detailed above and as further detailed at FIGS. 6-14 below.

In general, the various embodiments of the UE 105 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 105B and 101B may be of any type suitable to the local technical environment and may be implemented using any suitable data storage technology, such as semiconductor based memory devices, flash memory, magnetic memory devices and systems, optical memory devices and systems, fixed memory and removable memory. The DPs 105A and 101A may be of any type suitable to the local technical environment, and may include one or more of general purpose computers, special purpose computers, microprocessors, digital signal processors (DSPs) and processors based on a multicore processor architecture, as non-limiting examples.

Figure 6:
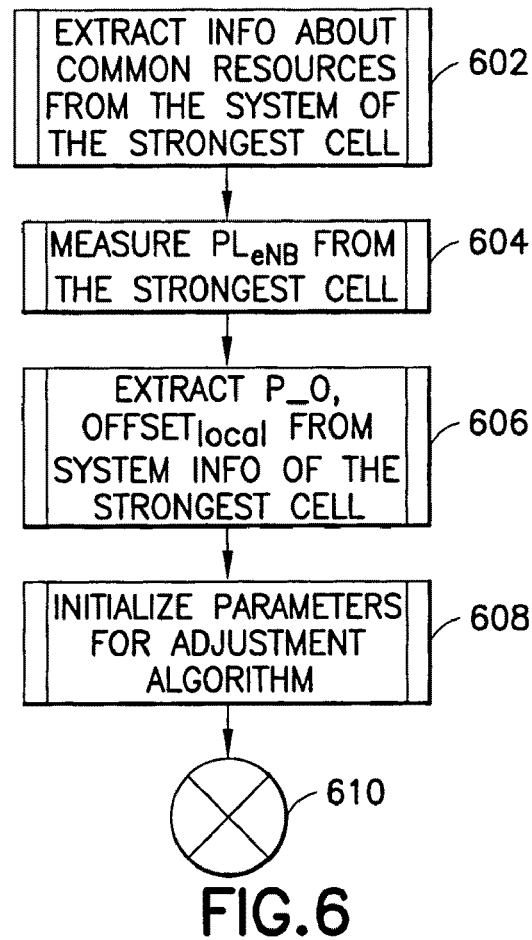
FIG. 6 is a logic flow diagram that illustrates, in accordance with an exemplary embodiment of this invention, the operation of a method, and a result of execution of computer program instructions embodied on a computer readable memory showing procedures before local communication may take place.

FIGS. 6-14 are logic flow diagrams that illustrate, in accordance with various exemplary embodiments of the invention, the operation of a method, and a result of execution of computer program instructions embodied on a computer readable memory showing procedures for various aspects of the invention. FIG. 6 illustrates process steps before local communication may take place and describes from the perspective of the D2D device/UE 105. At block 602 the UE 105 determines radio resources allocated for contention based access by extracting information about the common radio resources from the cellular system having the strongest cell/strongest signal strength or, for more general, the most suitable cell-selection properties. By example at FIG. 1 the D2D link 105d allocated for D2D contention based access is the cellular UL 105c. At block 604 the UE 105 measures pathloss on the link 105c with the eNB 101. At block 606 the UE 105 then extracts the target receive power P_0 and the local offset offset$_{local}$ for use in equation (2) above, along with the pathloss PL$_{eNB}$ from block 604, to determine P_0$_{local}$. At least initially the UE 105 can obtain the target receive power P_0 and the local offset offset$_{local}$ from system information broadcast or dedicated control information sent by the eNB in the cell. From these parameters the UE 105 can solve equation (2) above to find P_0$_{local}$. At block 608 the UE 105 initializes the other parameters, such as for example I$_{min}$ and offset, that are needed to run the channel access probability function shown by example at equation (1) above. Block 610 is where the channel access probability P$_{access\_channel}$ is computed, and the radio resource allocated for the D2D link 105d is accessed according to that computed probability.

Figure 7:
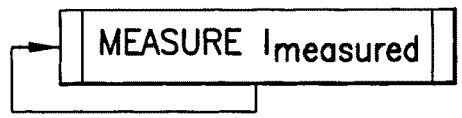
FIG. 7 is a logic flow diagram that illustrates, in accordance with an exemplary embodiment of this invention, the operation of a method, and a result of execution of computer program instructions embodied on a computer readable memory showing interference measurement.

The logic flow diagram of FIG. 7 simply shows that the UE 105 measures the interference I$_{measured}$ on the common resources which are the cellular UL 105c that is designated for D2D links 105d. This parameter is also needed to solve P$_{access\_channel}$ according to the above example equation (1). Note that all of the participating D2D UEs 105-106 measure their interference on the D2D links 105d.

Figure 8:
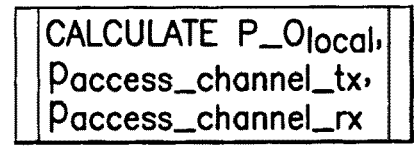
FIG. 8 is a logic flow diagram that illustrates, in accordance with an exemplary embodiment of this invention, the operation of a method, and a result of execution of computer program instructions embodied on a computer readable memory showing initial transmission power and channel access probability settings.

The logic flow diagram of FIG. 8 finalizes the access probability calculations. The UE 105 determines from parameters found at FIG. 6 the initial transmission power P_0$_{local}$ for the D2D link 105d using equation (2) above, and also solves equation (1) above to obtain channel access probability values for both transmit access P$_{access\_channel\_tx}$ and receive access P$_{access\_channel\_rx}$.

Figure 9:
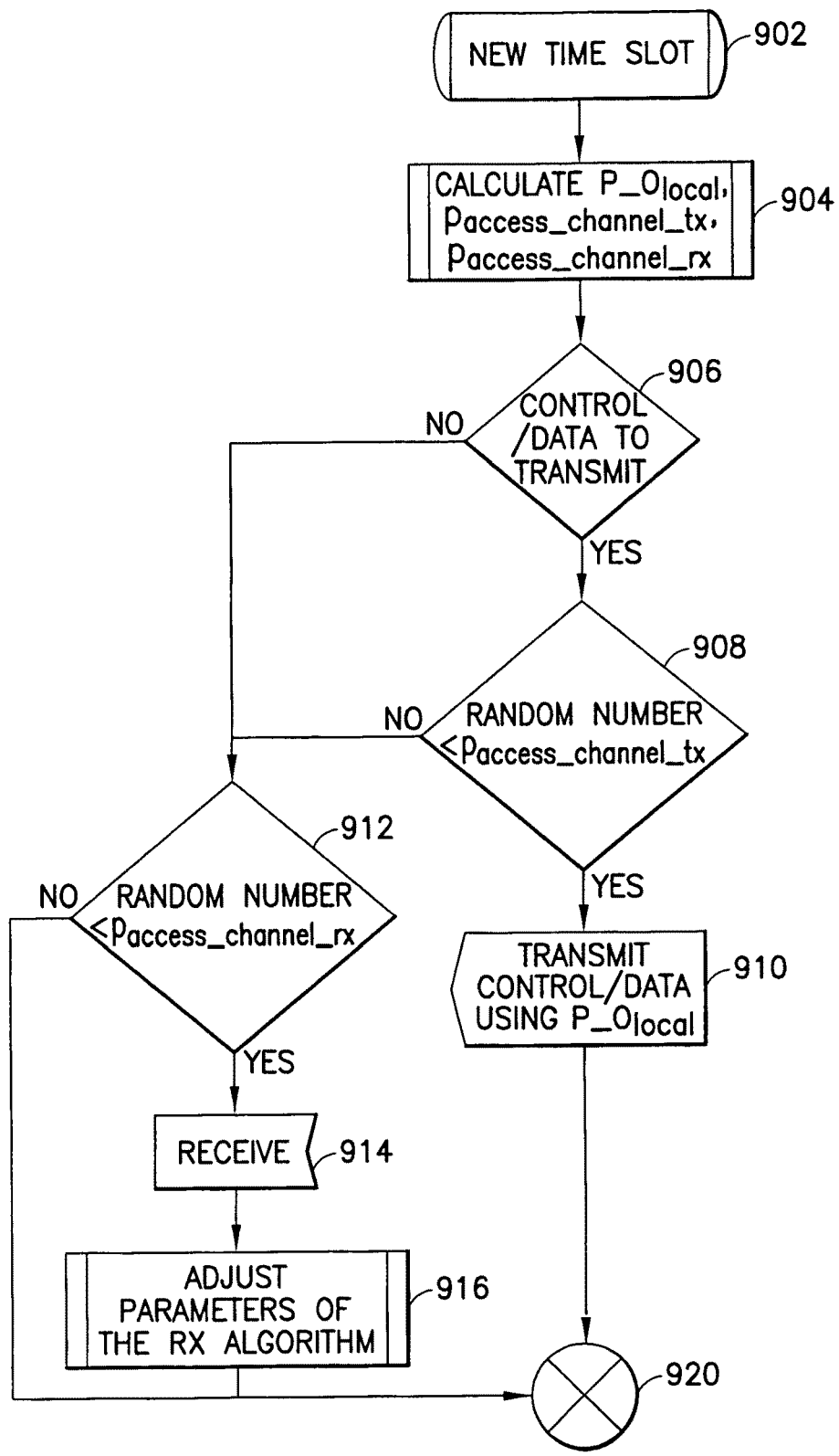
FIG. 9 is a logic flow diagram that illustrates, in accordance with an exemplary embodiment of this invention, the operation of a method, and a result of execution of computer program instructions embodied on a computer readable memory showing a transmission and receiving procedure.

The logic flow diagram of FIG. 9 shows the procedure for adjusting the parameters for the transmit and receive channel access probabilities. At block 902 a new time slot begins, such as for example a new transmission time interval TTI. At block 904 the UE 105 calculates a new P_0$_{local}$, P$_{access\_channel\_tx}$, and P$_{access\_channel\_rx}$, such as shown at FIG. 8 but using the newly calculated P_0$_{local}$. If at block 906 the UE 105 has control signaling and/or data to transmit, then the process continues to block 908 and a random number is generated and compared to the P$_{access\_channel\_tx}$ computed at block 904. If the random number is less, then at block 910 the UE 105 transmits its control signaling or data using the P_0$_{local}$ computed at block 904.

If either the result from block 906 instead is that the UE 105 has no control signaling and/or data to transmit, or if the random number at block 908 is not less than the transmit access probability P$_{access\_channel\_tx}$ that was computed at block 904, then FIG. 9 continues with the receive branch at block 912 and the random number from block 908 (or a newly generated random number if the receive branch was entered directly from block 906) is less than the receive access probability P$_{access\_channel\_rx}$ that was computed at block 904, then block 914 confirms that the UE 105 is allowed to receive on the D2D link 105d. At block 916 it adjusts the parameters for the P$_{access\_channel\_rx}$ algorithm that were initialized at block 608 of FIG. 6, and at block 920 for either the transmit or the receive branches of FIG. 9 the channel access probability is recomputed and the channel 105d accessed according to that probability.

FIG. 10A-B are logic flow diagrams that illustrate adjustments to the channel access probability calculations in view of previous successful transmissions. FIG. 10A illustrates from the perspective of the receiving device 106. At block 1002a the receiving device 106 successfully receives data or control signaling on the D2D link 105d in a current time slot after successfully receiving in a previous time slot, and at block 1004a sends some feedback indication to the sending device 105 which sent that successfully received data/control signaling. In the case where successive slots are successfully received, there is no adjustment to the parameters of the specific channel access probability function example shown above as equation (1), and so no need for the receiver device 106 to re-compute at FIG. 10A its receive channel access probability; it simply re-uses the formerly computed probability for its next receive channel access.

FIG. 10B illustrates from the perspective of the sending device 105. Block 1002b the receiving device 105 successfully sends data or control signaling on the D2D link 105d in a current time slot after successfully sending in a previous time slot. The sending device 105 knows that its previous transmission was successful due to a previous feedback for a previous time slot similar to that it receives at block 1004b for the current time slot. That current feedback received at 1004b is the same as was sent at block 1004a. At block 1006 the transmitting device 105 then adjusts the parameters for the P$_{access\_channel\_tx}$ algorithm that were initialized at block 608 of FIG. 6, and at block 1008 the transmitting device 105 re-computes the transmit channel access probability and accesses the channel 105d according to that probability.

FIG. 11 illustrates process steps for the case in which the data/control signaling is not successfully received at the receiving device 106. There is a threshold value n (integer greater than zero) which at block 1102 is compared against the number of attempts were made to send the same data/control signaling before it is successfully received at the receiving device 106. The sending device can send, with the data/control signaling, an indicator informing which iteration of a sending attempt the current transmission represents, or the indicator may be sent only in response to the transmitting device 105 receiving an acknowledgement from the receiving device 106 that the data/control signaling was successfully received.

For the case in which the number of attempts before a successful receiving is less than the value n, then at block 1104 the value of I$_{min}$ in the receive channel access probability function is increased. Conceptually, a smaller number of failed attempts, which lead to block 1104, means interference in the D2D channel 105d is not acute. Increasing the value of I$_{min}$ in the probability function of equation (1) above increases the probability that the device 105-106 will be allowed to access the channel, consistent with contention based access for a low-interference environment.

If instead the comparison at block 1102 finds that the number of attempts before a successful receiving is greater than the value n, then block 1106 operates as a weighting factor to assure the access probability is reduced commensurate with recent history of the channel becoming more congested. If we assume there are a number m of previous successive transmission attempts that were successfully received at the receiving device 106 on the first transmission attempt (m being an integer greater than zero), then a higher number of m indicates less congestion in the channel over the time window at which the channel is being reviewed. At block 1108 the value of $I_{min}$ is reduced, which reduces the probability value computed from equation (1) above, all other parameters being equal. The amount of the reduction taken to $I_{min}$ at block 1108 depends on the value of m at block 1106: higher m results in a lesser reduction to $I_{min}$ which yields a comparatively smaller reduction in the probability of channel access; and lower m results in a greater reduction to $I_{min}$ which yields a comparatively larger reduction in the probability of channel access.

Regardless of whether the process of FIG. 11 yields an increase to $I_{min}$ at block 1104 or a decrease to $I_{min}$ at block 1108, at block 110 the device 106 re-computes its receive channel access probability (equation 1) and accesses the channel 105d according to the resulting re-computed probability $P_{access\_channel\_rx}$.

Figure 12:
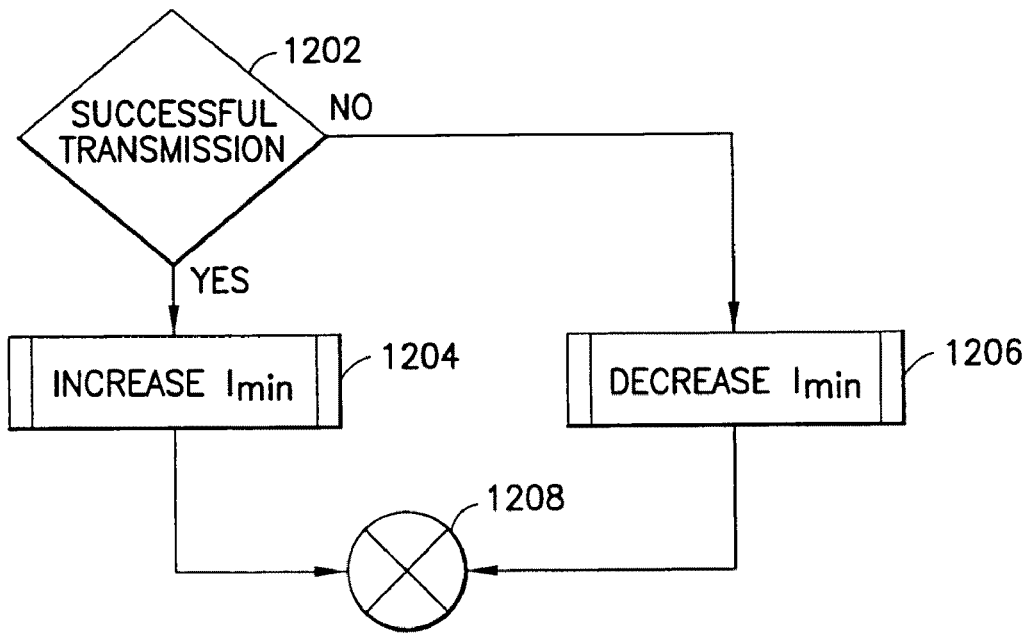
FIGS. 12-14 are logic flow diagrams that illustrates, in accordance with exemplary embodiments of this invention, the operation of methods, and a result of execution of computer program instructions embodied on a computer readable memory showing parameter adjustments of the transmission algorithm.
Figure 13:
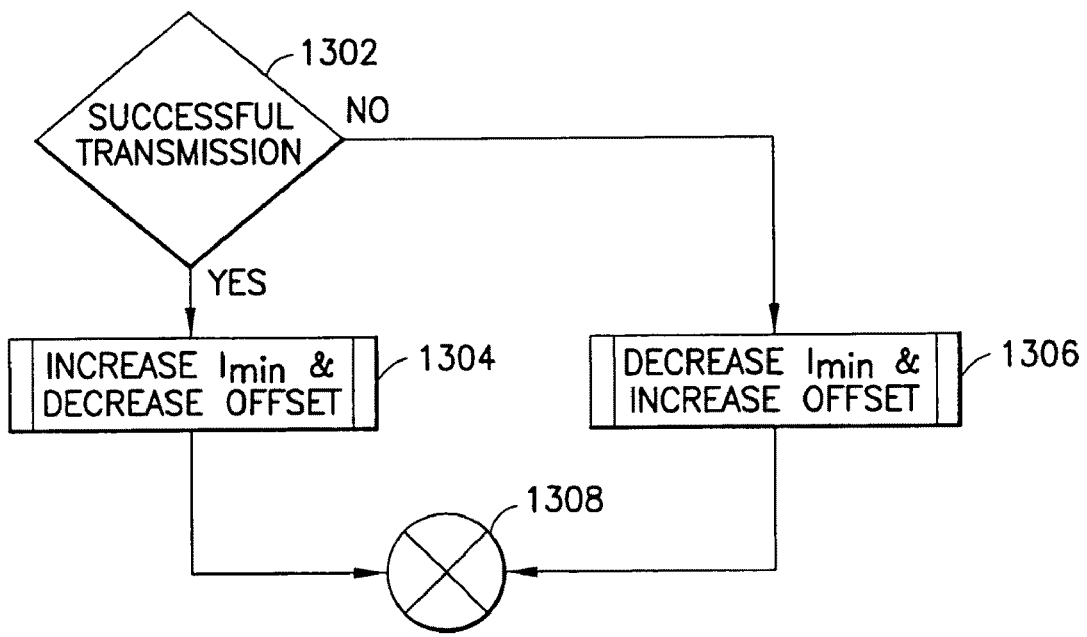
Figure 14:
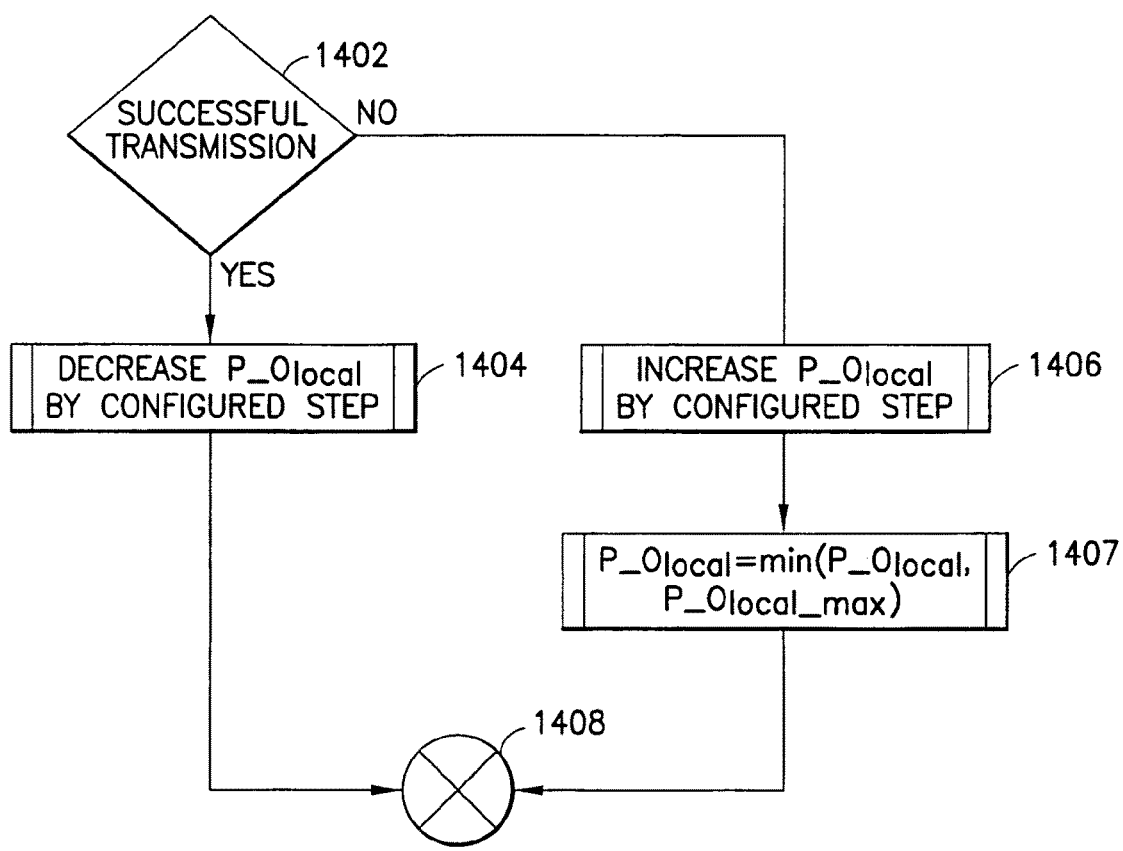

FIGS. 12-14 illustrate processes for adjusting various parameters of equation (1) by the transmitting device 105. At FIG. 12 the transmitting device sends a packet/message (data or control signaling) over the D2D link 105d at block 1202. If the sending at block 1202 is successful (regardless of whether it is the first attempt or a subsequent re-transmission), then at block 1204 the value for $I_{min}$ is increased, which results in the next re-computed transmit channel access probability at block 1208 being a greater probability of accessing the channel 105d. If the sending at block 1202 is not successful, then at block 1206 the value for $I_{min}$ is decreased, which results in the next re-computed transmit channel access probability at block 1208 being a lesser probability of accessing the channel 105d for a certain interference level.

FIG. 13 is similar to FIG. 12 except that FIG. 13 adjusts values of both $I_{min}$ and offset to implement the sliding window noted above. If the sending at block 1302 is successful, then at block 1304 the value for $I_{min}$ is increased and the value for offset is decreased, which results in the next re-computed transmit channel access probability at block 1308 being a greater probability of accessing the channel 105d. If the sending at block 1302 is not successful, then at block 1306 the value for $I_{min}$ is decreased and the value for offset is increased, which results in the next re-computed transmit channel access probability at block 1308 being a lesser probability of accessing the channel 105d.

FIG. 14 is similar to FIG. 12 except that FIG. 13 adjusts values of the D2D transmit power $P\_0_{local}$, which by exemplary equation (1) influences the channel access probability. If the sending at block 1402 is successful, then at block 1404 the value for the D2D transmit power $P\_0_{local}$ is decreased by one step or increment. This may or may not affect the channel access probability, but the next transmit attempt on the D2D link will be at the decreased transmit power reflecting the lack of interference indicated by the successful transmission at block 1402. If the sending at block 1402 is not successful, then at block 1406 the value for the D2D transmit power $P\_0_{local}$ is increased by one step or increment and the new value is compared at block 1407 against the maximum allowed transmit power on the D2D link which constrains $P\_0_{local}$ to be the lesser of the step-increased $P\_0_{local}$ of block 1406 and the maximum allowed power. The next transmit attempt on the D2D link will be at the increased transmit power of block 1407, reflecting the interference encountered by the unsuccessful transmission at block 1402. In either case the next transmit channel access probability that is re-computed at block 1408 uses the adjusted $P\_0_{local}$ from blocks 1404 or 1407, and the channel access attempt is made with the same adjusted $P\_0_{local}$.

One technical effect of the above exemplary embodiments is that the contention based channel access scheme that is integrated into a cellular system adapts to various challenging interference situations in the system, and such exemplary embodiments enable low power and low capability devices 105-106 to be integrated into operation of the cellular networks.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 6-14 may be viewed as method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:
1. A method, comprising:
  determining an allocated radio resource to be allocated for contention based access; and
  accessing the allocated radio resource according to a probability function that varies in dependence on at least one of interference measured on the allocated radio resource and a received power level for the allocated radio resource;

wherein the probability function is:

$$P_{access\_channel} \propto \frac{\max[0, P\_0_{local} + \text{offset} - \max(I_{measured}, I_{min})]}{P\_0_{local} + \text{offset} - I_{min}}$$

in which:
- $P\_0_{local}$ is a target received power level for the allocated radio resource;
- offset is a parameter to adjust the range in which greater than zero probabilities exist related to certain values of $P\_0_{local}$;
- $I_{measured}$ is the interference measured on the allocated radio resource; and
- $I_{min}$ is a parameter indicating the interference level for which $P_{access\_channel}=1$.

2. The method according to claim 1, in which the allocated radio resource is allocated by a cellular base station for use in a device-to-device communication;
the method further comprising providing configuration parameters for the device-to-device communication via common or dedicated signaling.

3. The method according to claim 1, in which the received power level is a target received power level that is received via system information broadcast or dedicated control from a cellular base station.

4. The method according to claim 1, in which the radio resource is allocated by a cellular base station for use in a device-to-device communication, and the received power level is itself a function of path loss on a wireless link to the cellular base station.

5. The method according to claim 1, in which the probability function varies in dependence on the interference and on the received power level and on a minimum interference level that is dynamically adjusted based on previous communication attempts over the allocated radio resource.

6. The method according to claim 5, in which the minimum interference level is dynamically adjusted based on a number of failed previous communication attempts over the allocated radio resource, the method further comprising communicating over the allocated radio resource the number of failed previous communication attempts.

7. The method according to claim 1, in which accessing the allocated radio resource according to the probability function is for transmitting on the allocated radio resource, and in which receiving on the allocated resource is at least initially a function of the transmitting probability function.

8. The method according to claim 7, in which receiving on the allocated resource is initially a function of the transmitting probability function, and afterwards receiving on the allocated resource is conditioned on the measured interference not exceeding a predetermined threshold.

9. A memory storing a program of computer readable instructions that when executed by at least one processor result in actions comprising:
determining an allocated radio resource to be allocated for contention based access; and
accessing the allocated radio resource according to a probability function that varies in dependence on at least one of interference measured on the allocated radio resource and a received power level for the allocated radio resource;

wherein the probability function is:

$$P_{access\_channel} \propto \frac{\max[0, P\_0_{local} + \text{offset} - \max(I_{measured}, I_{min})]}{P\_0_{local} + \text{offset} - I_{min}}$$

in which:
- $P\_0_{local}$ is a target received power level for the allocated radio resource;
- offset is a parameter to adjust the range in which greater than zero probabilities exist related to certain values of $P\_0_{local}$;
- $I_{measured}$ is the interference measured on the allocated radio resource; and
- $I_{min}$ is a parameter indicating the interference level for which $P_{access\_channel}=1$.

10. The memory according to claim 9, in which the allocated radio resource is allocated by the cellular base station for use in a device-to-device communication.

11. An apparatus, comprising:
at least one processor; and
at least one memory storing computer program code;
the at least one memory and the computer program code configured, with the at least one processor, at least to:
determine an allocated radio resource to be allocated for contention based access; and
access the allocated radio resource according to a probability function that varies in dependence on at least one of interference measured on the allocated radio resource and a received power level for the allocated radio resource;
wherein the probability function is:

$$P_{access\_channel} \propto \frac{\max[0, P\_0_{local} + \text{offset} - \max(I_{measured}, I_{min})]}{P\_0_{local} + \text{offset} - I_{min}}$$

in which:
- $P\_0_{local}$ is a target received power level for the allocated radio resource;
- offset is a parameter to adjust the range in which greater than zero probabilities exist related to certain values of $P\_0_{local}$;
- $I_{measured}$ is the interference measured on the allocated radio resource; and
- $I_{min}$ is a parameter indicating the interference level for which $P_{access\_channel}=1$.

12. The apparatus according to claim 11, in which the allocated radio resource is allocated by a cellular base station for use by the apparatus in a device-to-device communication;
the apparatus further configured to receive via common or dedicated signaling from the cellular base station configuration parameters for the device-to-device communication.

13. The apparatus according to claim 11, in which the received power level is a target received power level that the apparatus receives via system information broadcast or dedicated control from a cellular base station.

14. The apparatus according to claim 11, in which the radio resource is allocated by a cellular base station for use in a device-to-device communication, and the received power level is itself a function of path loss on a wireless link to the cellular base station.

15. The apparatus according to claim 11, in which the probability function varies in dependence on the interference and on the received power level and on a minimum interference level that is dynamically adjusted based on previous communication attempts over the allocated radio resource.

16. The apparatus according to claim 15, in which the at least one memory and the computer program code are configured, with the at least one processor, to dynamically adjust the minimum interference level based on a number of failed previous communication attempts over the allocated radio resource, in which the number of failed previous communication attempts is communicated over the allocated radio resource.

17. The apparatus according to claim 11, in which the apparatus accesses the allocated radio resource according to the probability function for transmitting on the allocated radio resource, and in which the at least one memory and the computer program code are configured with the at least one processor to receive on the allocated resource at least initially as a function of the transmitting probability function.

18. The apparatus according to claim 17, in which the at least one memory and the computer program code are configured with the at least one processor to receive on the allocated resource initially as a function of the transmitting probability function, and afterwards to receive on the allocated resource conditional on the measured interference not exceeding a predetermined threshold.

* * * * *